United States Patent [19]
Faget

[11] 4,165,554
[45] Aug. 28, 1979

[54] HAND-HELD PORTABLE CALCULATOR ASSEMBLY

[76] Inventor: Charles J. Faget, 572 E. Marlin Ct., Gretna, La. 70053

[21] Appl. No.: 914,546

[22] Filed: Jun. 12, 1978

[51] Int. Cl.² .............................................. G06C 5/00
[52] U.S. Cl. ................................. 16/114 R; 235/1 D; D18/7
[58] Field of Search .................... D64/11 B; 235/1 D; 16/110 R, 114 R

[56] References Cited
U.S. PATENT DOCUMENTS

| | | | |
|---|---|---|---|
| 3,961,159 | 6/1976 | Hursey | 235/1 D |
| 4,020,527 | 5/1977 | O'Neill | 16/110 R |

Primary Examiner—Andrew V. Kundrat
Attorney, Agent, or Firm—David L. Ray; Edgar E. Speilman, Jr.

[57] ABSTRACT

A hand-held, portable, electronic calculator assembly including a body with a gripping and covering member for making the calculator fully operable by the user with one hand and for covering the keyboard of the calculator to prevent damage to the keyboard or depression of the keys when not in use. The hand-held electronic calculator assembly includes a calculator body member having a front surface, the front surface containing means for receiving a covering and gripping member and containing keyboard means, a back surface opposite the front surface containing means for receiving and gripping the covering member, and a gripping and covering member adapted for placement on the back surface of the calculator to enable operation and holding of the calculator by one hand and for placement on the top surface of the electronic calculator for covering the keyboard.

10 Claims, 7 Drawing Figures

HAND-HELD PORTABLE CALCULATOR ASSEMBLY

BACKGROUND OF THE INVENTION

The present invention relates to portable hand-held electronic calculators. More particularly, the present invention relates to a calculator body and combined grip and cover for the calculator body.

Portable electronic calculators are presently designed to be used on desk tops or held with one hand while the keyboard is activated with the other. It is sometimes desirable to be able to make notes or otherwise occupy one hand of the user while holding the calculator in the other hand. However, such use requires the calculator be placed on a flat surface and the pencil be released to enable the desired hand to punch the keys. Very often when used on a flat surface the line of sight for reading the calculator is not optimum.

U.S. Pat. No. 4,020,527, issued May 3, 1977, to O'Neal discloses a grip for attaching a calculator to the hand of the user, the grip being a hollow member into which a finger or fingers are inserted. U.S. Pat. No. 3,961,159, issued June 1, 1976, to Hursey, discloses a light shield and a support device which may be attached to a hand-held calculator to raise the calculator at an angle relative to the surface on which it is lying.

SUMMARY OF THE INVENTION

In accordance with the present invention there is provided a hand-held portable electronic calculator assembly including a calculator body member having a front surface, the front surface containing means for receiving a covering and gripping member and containing keyboard means, a back surface opposite the front surface containing means for receiving and gripping the covering member, and a gripping and covering member adapted for placement on the back surface of the calculator to enable operation and holding of the calculator by one hand and for placement on the top surface of the electronic calculator for covering the keyboard.

DESCRIPTION OF THE PREFERRED EMBODIMENTS

Figure 1:
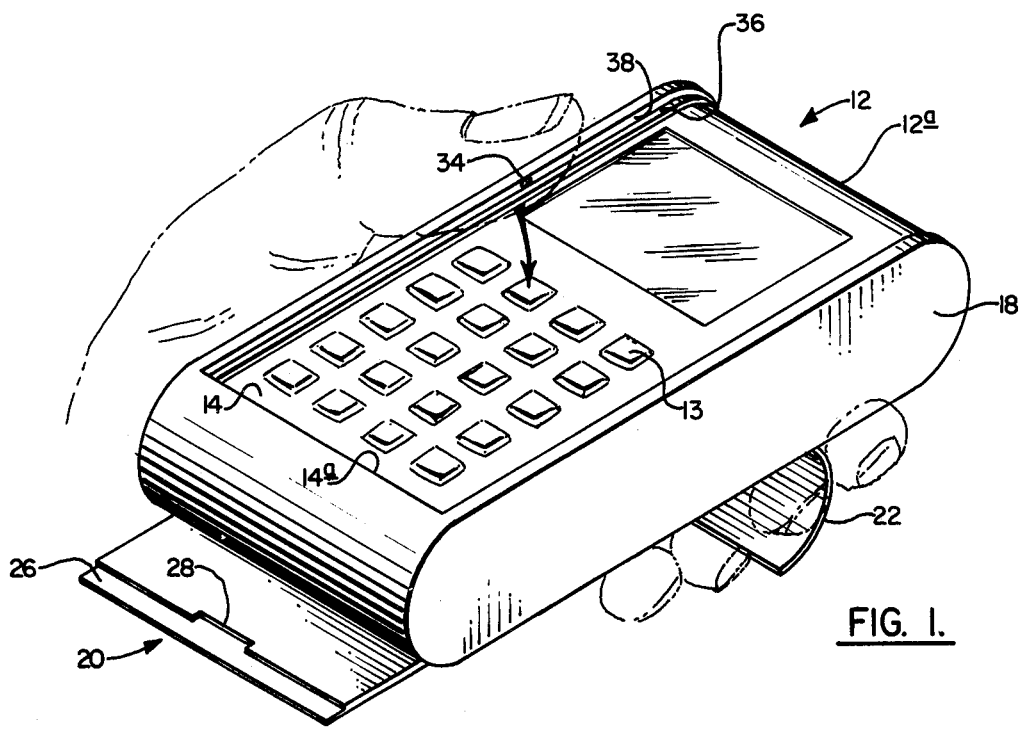
FIG. 1 is a perspective view of the grip and cover in place on the calculator with the hand of the user positioned for one-hand operation of the calculator.

Referring now to FIG. 1, there is illustrated a hand-held, portable electronic calculator generally indicated by the numeral 12 having a body member 12a and a keyboard 13. A gripping member and cover, generally indicated by the numeral 20, is shown attached to the bottom of the calculator.

Figures 4, 5:
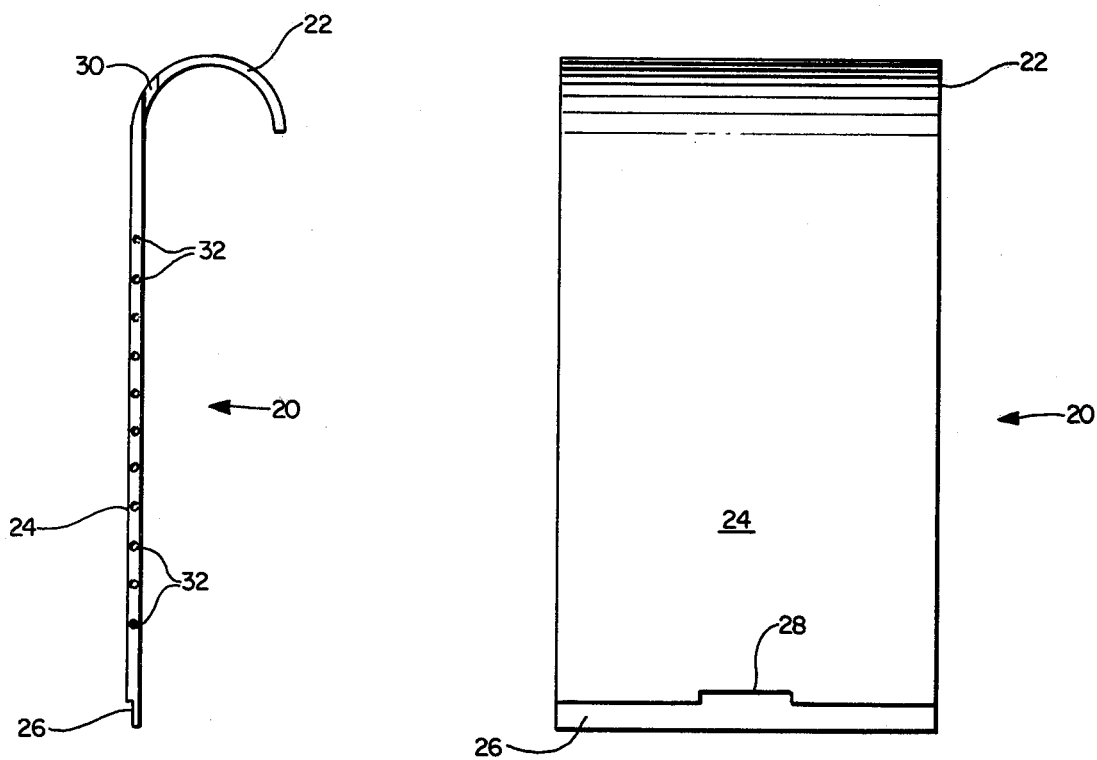
FIG. 4 is a side view of the grip and cover member.
FIG. 5 is a top plan view of the grip and cover member.

The gripping and covering member 20 shown in FIGS. 2, and 4 thru 6 can be seen to have a flat rectangular portion 24 which at one end is connected to curved portion 22 and at the other end has a notched portion 26 which in turn contains a thumb slot 28 for insertion of the thumb of the user when removing the cover. Although the cover 20 is shown with a curved portion 22, the curved portion 22 could be changed to a different configuration if desired to match or nest with a calculator having the same configuration at the ends thereof. Located at each side of the end containing the curved portion 22 is slot 30 which is needed when the gripping member 20 is attached to the bottom surface 16 of the electronic calculator in the mode shown in FIG. 1 so that the gripping member 20 will not interfere or jam on lower ledge 43. In FIG. 4, gripping member and cover 20 can be seen to have a series of indentions or depressions 32 located along the sides thereof.

Figure 2:
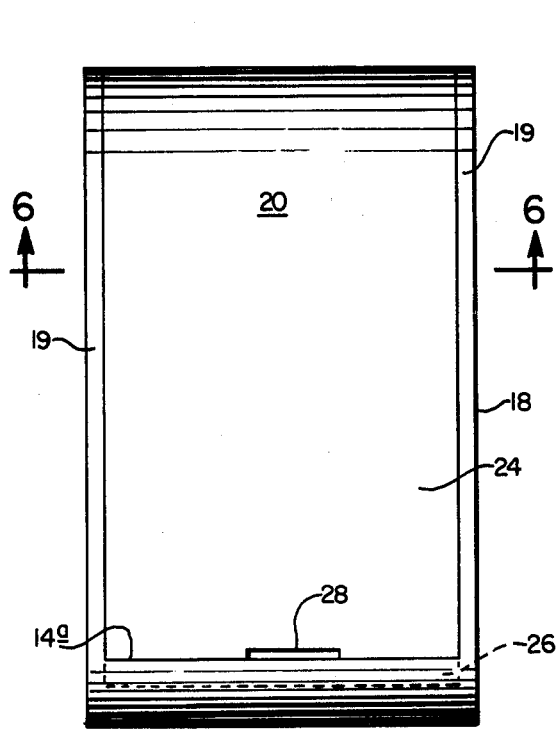
FIG. 2 is a top plan view of the calculator with the grip and cover attached.
Figure 3:
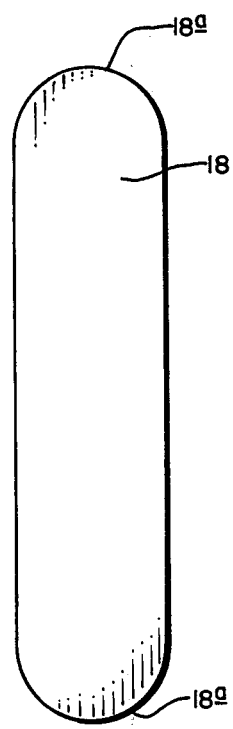
FIG. 3 is a side view of FIG. 2.

The body member 12a of electronic calculator 12 can be seen in FIGS. 1 thru 3 to have sides 18, an upper surface 14 upon which keyboard 13 is located, and a flat surface 16. Both ends 18a of body member 12a of electronic calculator 12 can be seen to be curved as shown in FIG. 3. However, if desired, the ends 18a could be of any other configuration with cover 20 being of the same configuration to nest on the ends 18a. On the upper surface 14 of electronic calculator 12 are two ridges 19 which border keyboard 13. Ridges 19—19 have inner walls 38—38 upon which are located detents 34—34, one detent on each wall. Immediately below detents 34—34 are ledges 36—36 for receiving cover 20 when cover 20 is placed in the covering mode as shown in FIG. 2.

To place cover 20 in the covering mode, the curved portion 22 of cover 20 is turned downwardly to nest with the end of the calculator as shown in FIG. 2 and the flat portion 24 is placed over the upper surface 14 and over ledges 36—36 of the calculator. A downward force is applied to the cover 20 to force the cover member downward onto ledges 36—36 and in between walls 38. The cover is then in place parallel to the surface 14. The cover 20 is then pushed toward ledge 14a until notched portion 26 nests underneath the lower ledge 14a of upper surface 14 exposing only thumb slot 28 for easy removal of the cover. The detent 34 is received in depression 32 and cover 20 to hold cover 20 in the position shown in FIG. 2.

Slot 40 is located on the lower surface of calculator 20 and has detents 42—42 on the inside wall thereof. Also, slot 40 has a lower ledge 43 to contain the gripping member or cover 20 between the lower ledge 43 and the lower surface 16.

Figure 6:
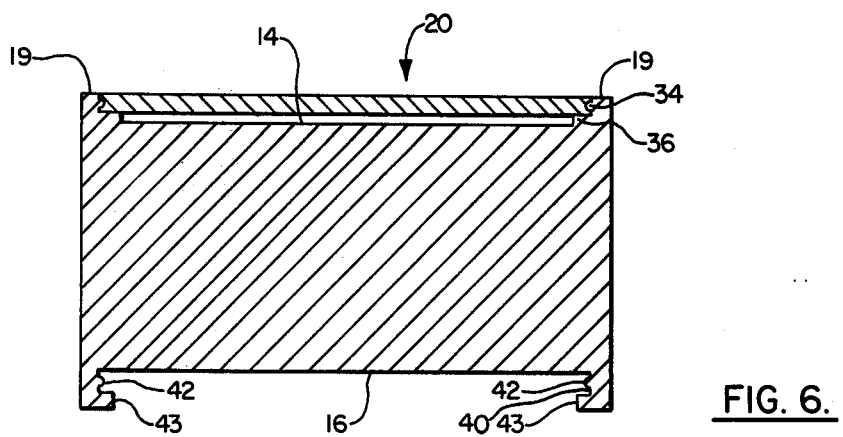
FIG. 6 is a cross-sectional view taken along lines 6—6 of FIG. 2.
Figure 7:
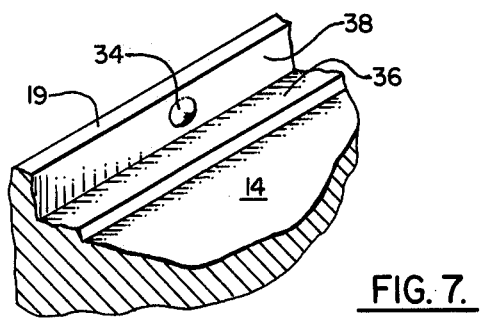
FIG. 7 is an enlarged, cut-away, partly sectional view of the top of the calculator.

To place the gripping member or cover 20 in the gripping position, the cover 20 is removed from the calculator when in the position of FIG. 2 by inserting the thumb or fingernail in thumb slot 28 to snap the cover loose from the calculator. The cover is then aligned with slot 40, as shown in FIGS. 1 and 6, on the bottom surface 16 of the electronic calculator. The flat surface 24 of gripping member 20 is aligned in the slots 40 and either forced toward one or the other end of the calculator to achieve the position desired. Ledge 43 is received and slides in slot 30 provided in cover 20. The curved portion 22 is, of course, positioned downwardly so that one finger may be placed on the outside of the curved portion or the convex side of the curved portion 22 and another finger placed on the inside or concave side of the curved portion 22 to firmly grasp the calculator.

Thus, when the gripping member is in the mode shown in FIG. 1, the calculator may be held in one hand and the thumb used to operate the keyboard. One hand of the user of the calculator is free for writing or making notations and the like. As is obvious, either hand may be used to grasp the gripping member and cover of the invention.

Having fully described the invention, it is desired that it be limited only within the scope and spirit of the following claims.

What is claimed:

1. A hand-held, portable, electronic calculator assembly comprising:
   a. a calculator body means having
      i. a front surface means, said front surface means containing keyboard means and first means for receiving a gripping and covering means, and
      ii. a back surface means opposite said front surface means containing second means for receiving said gripping and covering means; and
   b. gripping and covering means adapted for
      i. placement on said back surface means of said calculator body means to enable operation and holding of said calculator body means by one hand, and
      ii. placement on said front surface of said calculator body means for covering said front surface and preventing access to said keyboard means.

2. The apparatus of claim 1 wherein said gripping and covering means has a flat portion means for covering said front surface means of said keyboard means.

3. The apparatus of claim 1 wherein said gripping and covering means has means at one end thereof for covering one end of said calculator body means.

4. The apparatus of claim 2 wherein said front surface means of said calculator body means contains two ridge means projecting upwardly from said front surface means which form two walls for holding and receiving said gripping and covering means and a ledge means upon which said gripping and covering means rests.

5. The apparatus of claim 4 wherein said walls have at least one detent means thereon for receipt in depression means in said gripping and covering means to hold said gripping and covering means in the desired position on said calculator body means.

6. The apparatus of claim 1 wherein said gripping and covering means is adapted for contact and gripping by the fingers of the user.

7. The apparatus of claim 1 wherein said back surface means of said calculator body means contains first slot means therein for receiving said gripping and covering means.

8. The apparatus of claim 7 wherein said first slot means have detents therein for receiving and holding said gripping and covering means.

9. The apparatus of claim 8 wherein said first slot means has ledge means for holding said gripping and covering means.

10. The apparatus of claim 9 wherein said gripping and covering means has second slot means therein for receipt of said ledge means contained in said first slot means on said bottom surface of said calculator.

* * * * *